(12) United States Patent
Dougherty (10) Patent No.: US 11,937,570 B2
(45) Date of Patent: Mar. 26, 2024

(54) ARMREST PET HAMMOCK DEVICE

(71) Applicant: Kenneth Logan Dougherty, Greencastle, PA (US)

(72) Inventor: Kenneth Logan Dougherty, Greencastle, PA (US)

( * ) Notice: Subject to any disclaimer, the term of this patent is extended or adjusted under 35 U.S.C. 154(b) by 0 days.

(21) Appl. No.: 17/711,514

(22) Filed: Apr. 1, 2022

(65) Prior Publication Data
US 2023/0309506 A1    Oct. 5, 2023

(51) Int. Cl.
*A01K 1/035*    (2006.01)
*A45F 3/22*    (2006.01)

(52) U.S. Cl.
CPC .............. *A01K 1/035* (2013.01); *A45F 3/22* (2013.01)

(58) Field of Classification Search
CPC .................................. A01K 1/035; A45F 3/22
See application file for complete search history.

(56) References Cited

U.S. PATENT DOCUMENTS

| | | | | |
|---|---|---|---|---|
| 5,170,521 A * | 12/1992 | Light | ...................... | A47C 17/84 5/118 |
| 5,213,060 A * | 5/1993 | Sloan | ...................... | A01K 1/035 119/28.5 |
| 5,274,863 A * | 1/1994 | Fountain | ................... | A45F 3/22 5/120 |
| 5,351,648 A * | 10/1994 | Elesh | ....................... | E06B 7/28 119/28.5 |
| 5,560,056 A * | 10/1996 | Tai | ............................ | A45F 3/22 5/120 |
| 5,794,385 A * | 8/1998 | Donovan | ............... | A01K 1/035 49/70 |
| 9,486,383 B1 * | 11/2016 | Pichnarcik | .......... | A63B 21/0442 |
| 10,842,126 B1 * | 11/2020 | Volin | .................... | A01K 13/001 |
| 2006/0042548 A1 * | 3/2006 | Tharalson | ............ | A01K 1/035 119/28.5 |
| 2009/0008005 A1 * | 1/2009 | Chu | ......................... | A01K 1/03 150/154 |
| 2009/0045155 A1 * | 2/2009 | Howard | ................. | A47B 96/00 211/186 |
| 2009/0085021 A1 * | 4/2009 | Wang | ..................... | A01K 1/035 256/65.01 |
| 2009/0199783 A1 * | 8/2009 | Wilmore | ............... | A01K 1/035 119/702 |

(Continued)

*Primary Examiner* — Monica L Perry
*Assistant Examiner* — Aaron M Rodziwicz (57) ABSTRACT

A pet hammock for placement on a chair's armrests includes a first and a second elongated armrest cover, each having a top, a bottom, a rigid core, and a pair of opposed first and second sides, wherein the top is adapted to temporarily attach to a fabric covering, the bottom is adapted to grip the top of an armrest of a chair, and the first and the second sides are adapted with a plurality of slots encircled by the armrest cover which extend between the bottom and the top of said armrest cover for receiving strings or straps which allows the armrest cover to be secured to an armrest of a chair, and a fabric covering includes a rectangular fabric sheet having a first end and a second end, a topside, and an underside, wherein the first end of the underside is adapted to temporarily attach to the top of the first armrest cover and the second end of the underside is adapted to temporarily attach to the top of the second armrest cover which creates a suspended sleeping area for small pets generally positioned over a user's thighs.

20 Claims, 14 Drawing Sheets

(56) References Cited

U.S. PATENT DOCUMENTS

| | | | | |
|---|---|---|---|---|
| 2010/0093236 | A1* | 4/2010 | Harris | B63B 34/50 |
| | | | | 119/702 |
| 2010/0154719 | A1* | 6/2010 | Kellogg | A01K 15/025 |
| | | | | 119/702 |
| 2011/0231992 | A1* | 9/2011 | Bernat | A45F 3/24 |
| | | | | 5/127 |
| 2012/0318206 | A1* | 12/2012 | van Leeuwen | A01K 5/0114 |
| | | | | 248/163.1 |
| 2014/0109834 | A1* | 4/2014 | Hora | A01K 1/035 |
| | | | | 119/28.5 |
| 2016/0309911 | A1* | 10/2016 | Dollar | A47D 13/063 |
| 2017/0020104 | A1* | 1/2017 | Wilson | A01K 1/0353 |
| 2018/0064061 | A1* | 3/2018 | Koskey, Jr. | E06B 7/28 |
| 2019/0038036 | A1* | 2/2019 | Squires | F16B 12/44 |
| 2019/0274277 | A1* | 9/2019 | Wilson | F16B 5/0614 |
| 2022/0211164 | A1* | 7/2022 | Tejeda | A45F 3/24 |
| 2022/0225788 | A1* | 7/2022 | Guo | A47D 7/002 |

\* cited by examiner

ARMREST PET HAMMOCK DEVICE

CROSS-REFERENCE TO RELATED APPLICATIONS

N/A

BACKGROUND OF THE INVENTION

1. Field of the Invention

The present invention is in the field of chair accessories, particularly for office chairs.

2. Description of Related Art

Many pets enjoy resting on their owner's lap and the pet owners also enjoy this interaction but this can make the owner feel overheated or cause their clothes to be covered with pet fur. Many smaller pets are actually too large to rest on the owner's lap comfortably. The pet's large size can be awkward and uncomfortable causing leg cramps which results in frequent repositioning of one's legs. This disrupts the sleeping pet and causes the pet to rest elsewhere.

One solution is to purchase a pet bed that sits on top of one's lap, but many of these types of pet beds are often too wide to fit comfortably between the armrests of many office chairs. The lap beds previously invented also do not create a sufficient gap between the device and the user's legs causing any lower body movement to transfer through the device and disrupt the resting pet. Many pets, specifically cats, are most comfortable being cradled which is why hammock-style beds are popular. This is a feature where most lap top pet beds are found to be deficient.

Similar pet bed designs disclosed by U.S. Pat. No. 9,486,072 B1 to Chapman (2015) are designed to support the pet's weight while also creating a gap for the user's legs, requiring the device to be very bulky to ensure the device maintains shape while in use by the pet. For heavier pets, this device may also require the use of a removable pillar positioned between the user's legs to help prop up the resting area. These designs require the use of additional materials and time to create a specific support frame for the pet bed. This results in wasted materials for the manufacturer, increased shipping costs for retailers selling the item, and higher prices for consumers.

Therefore, what is clearly needed is a pet bed that solves the problems mentioned above.

BRIEF SUMMARY OF THE INVENTION

The objects and advantages of the armrest pet hammock device of the present invention are as follows:

(a) The hammock design requires no integral support frame other than the supplied armrest extenders. The support for the hammock comes from the consumer's existing chair. The fabric covering is attached to the specifically designed elongated armrest covers which easily attach to the armrests of the chair and rests between the armrests directly in front of the user. This results in lower manufacturing costs due to less complexity and lower material requirements.

(b) Having the hammock positioned directly in front of the user provides the benefit of emotional support one receives from having an animal nearby.

(c) Since the fabric covering is suspended over a user's thighs, any lower body movement will not disrupt the resting pet which will result in further use of the hammock bed from the pet and buyer satisfaction of the consumer.

(d) Since the fabric covering and armrest extenders are equipped with hook and loop material, this allows the user the ability to customize the tension of the fabric covering to accommodate a wide range of pet weights and/or comfort needs.

(e) Since a significant portion of the fabric covering underside is equipped with hook and loop material, it allows the device the flexibility to fit a wide variety of chair sizes.

(f) By removing the support frame from the design, the armrest pet hammock device can be shipped in a smaller amount of space resulting in a cost savings to both the retailer and consumer.

Further objects and advantages of my invention will become apparent from a consideration of the drawings and ensuing description.

In one embodiment of the invention, a pet hammock for placement on a chair's armrests is provided, comprising a first and a second elongated armrest cover, each having a top, a bottom, a rigid core, and a pair of opposed first and second sides, wherein the top is adapted to temporarily attach to a fabric covering, the bottom is adapted to grip the top of an armrest of a chair, and the first and the second sides are adapted with a plurality of slots encircled by the armrest cover which extend between the bottom and the top of said armrest cover for receiving strings or straps which allow the armrest cover to be secured to an armrest of a chair, and a fabric covering, comprising a rectangular fabric sheet having a first end and a second end, a topside, and an underside, wherein the first end of the underside is adapted to temporarily attach to the top of the first armrest cover and the second end of the underside is adapted to temporarily attach to the top of the second armrest cover which creates a suspended sleeping area for small pets generally positioned over a user's thighs.

DETAILED DESCRIPTION OF THE INVENTION

The inventor provides a hammock device for a small pet (e.g., cat, lap dog, rabbit, etc.) that attaches to the armrests of a chair which allows the pet to comfortably rest directly in front of the user without being disrupted by the user's lower body movement. As a result, the user can comfortably work at their desk while benefitting from the emotional support one receives from having an animal nearby. The device allows the animal to essentially be on the user's lap without getting pet hair on the user's clothes. As will be discussed further below, the tension of the fabric covering of the device is adjustable to accommodate a wide range of pet sizes and/or comfort needs. The device has the ability to span a wide range of chair sizes. Since the device primarily uses a chair's existing armrests to support the weight of the pet, it is able to be manufactured with minimal materials compared to similar devices. The present invention is described in enabling detail in the following examples, which may represent more than one embodiment of the present invention.

Referring now to FIGS. 1-8, armrest pet hammock device 100 includes two identical elongated armrest covers 110 (shown in detail in FIG. 8) that attach to a typical chair's 300 existing armrests 304 and a fabric covering 200 that stretches across the user's lap and connects to the mating layer 103 on both of the armrest covers 110 which creates a suspended rest area for a small pet.

At the core of the armrest covers 110 is a rigid core 101 to which all other main armrest cover 110 components are connected. The core 101 will generally have length C (FIG. 7B) of from about 40 to 60 cm, for example, 50 to 55 cm, which is roughly the maximum length the armrest cover 110 can be while still allowing the user to comfortably reach objects on a desk or table since the device will likely interfere with the chair's ability to get close to the desk or table.

Figure 7A:
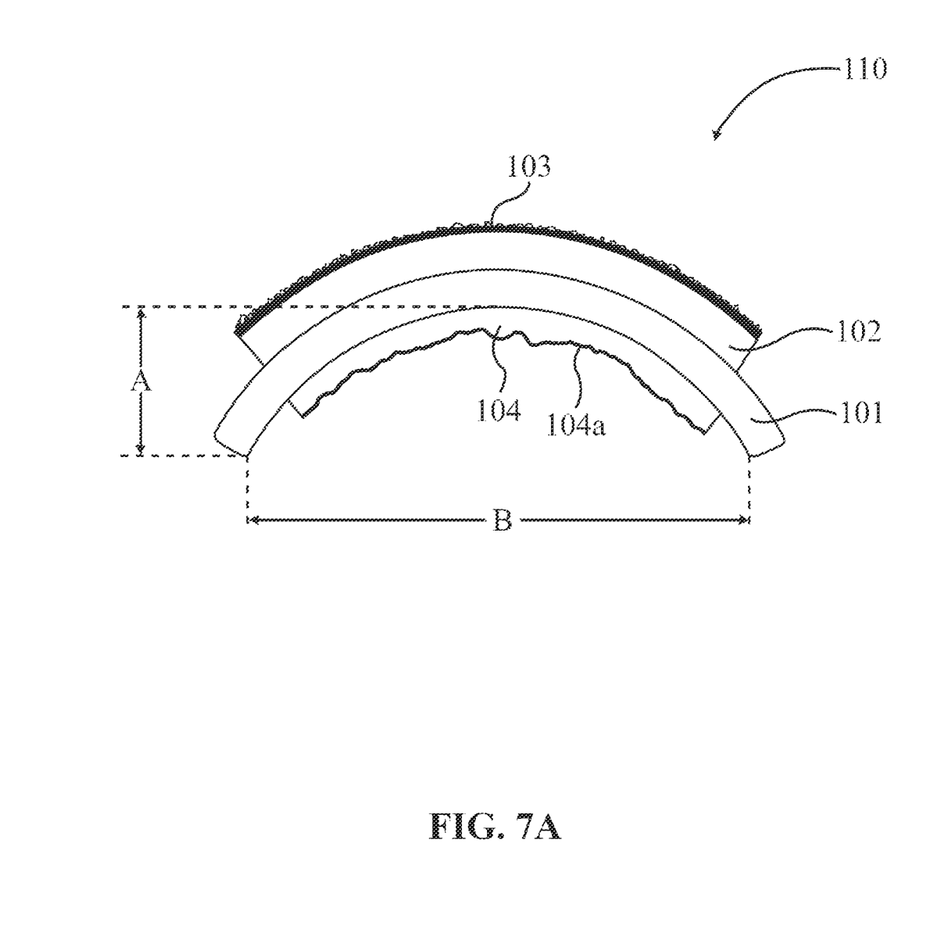
FIGS. 7A and 7B are front and side views, respectively, of the armrest pet hammock device of FIG. 1A displaying only one of the elongated armrest covers without attachment straps.

As can been seen in FIG. 7A, the core 101 may have a concave nature that extends uniformly the entire length of the core 101 which will generally have lengths A and B (FIG. 7A) which combine to form a radius of curvature of from about 3 to 8 cm, e.g., from about 4 to 6 cm, to accommodate the armrest width of most office chairs. The curvature of the core 101 is also designed to match the curvature of most office chair armrest which allows the bottom of the armrest cover 110 to maximize the contact area between the armrest cover 110 and the armrest top 305.

The core 101 may have a plurality of holes 105, positioned along the lengthwise edges of the core 101, where the holes are encircled by the armrest cover 110 which extend between the bottom and the top portions of said armrest cover 110 that allow straps, string or other similar devices 106 to connect both sides of the core 101 while traveling across the underside of the armrest 304 so that when the straps, string or other similar devices 106 are sufficiently tightened, the armrest cover 110 is secured to the armrest 304.

In the exemplary embodiment, the core 101 is made from a resilient and rigid material including plastics, woods, fiberglass, metals, and composite materials with a thickness suitable for supporting a small pet (e.g., cat, lap dog, rabbit, etc.).

Figure 8:
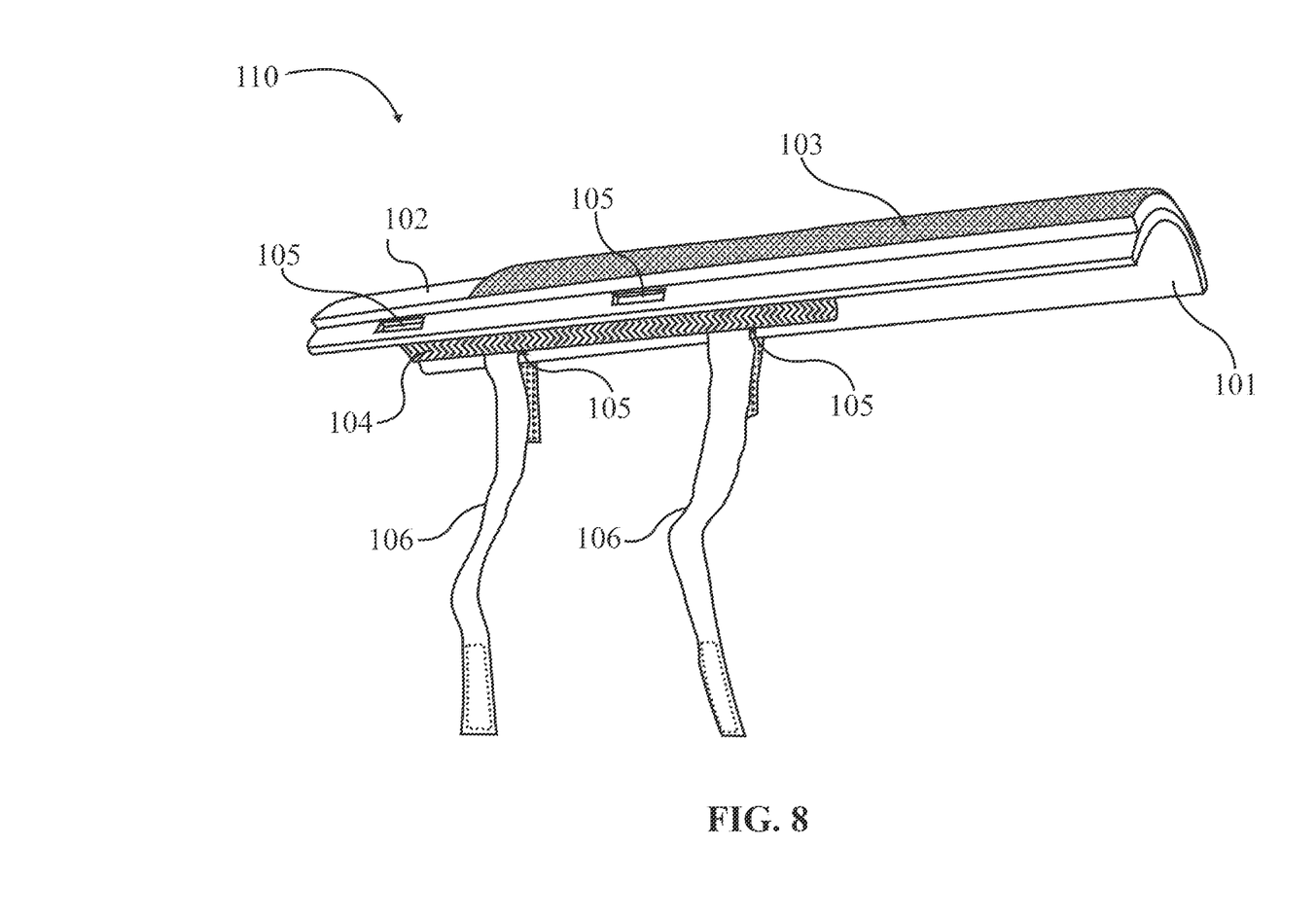
FIG. 8 is a side perspective view of the armrest pet hammock device of FIG. 1A displaying only one of the elongated armrest covers with attachment straps.

The non-slip layer 104 is attached to the underside of the core 101 and when the armrest cover 110 is properly fastened to the armrests 304, the non-slip layers 104 grips the armrest top 305 and prevents the armrest covers 110 from rotating inwards when sustained downward force is applied to the fabric covering 200, a sustained force similar to a small pet lying in the rest area provided by the device. The non-slip layer 104 will generally have a length of from about 20 to 40 cm, for example, 25 to 35 cm, which is roughly the length of a typical office chair armrest and will generally start at the end of the device nearest to the user and cover roughly 30 to 60% of the underside of the core 101. The non-slip layer 104 will generally be made from a compressible material such as closed cell foam where the exposed side of the foam has a non-slip polymer coating 104a. The compressible material shall allow the non-slip layer 104 the ability to contour to the shape of the armrest top 305 which increases the contact area which increases the device's grip strength. Suitable materials for the non-slip layer 104 include foams, for example neoprene sponge rubber and other types of resilient foams. The foam will generally have a width of from about 3 to 8 mm. The foam may be open or closed cell. Suitable foams include those having a density of from about 2.0 to 9.0 pounds per cubic foot, a compression deflection 25% of from about 6.0 to 9.0 pounds per square inch, and a shore hardness of from about 40 to 60 Shore 00, e.g., about 45 to 55 Shore 00. Suitable materials for the non-slip polymer coating 104a include rubbers or gels, for example latex and other types of non-slip polymers. Suitable polymers include those having a shore hardness of from about 10 to 50 Shore 00, e.g., about 10 to 15 Shore 00. In some embodiments, the non-slip polymer coating 104a may be applied directly to the underside of the core 101. As can be seen in FIG. 8, the non-slip layer 104 may have texture to further improve grip.

The padding layer 102 is attached directly to the topside of the core 101 and is designed to add a layer of padding between the user's arms and the rigid core 101. The padding layer 102 will generally have the same length as the core 101 and may cover the entire width of the core 101 but will generally stop short of the lengthwise edges to give room for holes 105. The padding layer 102 will generally be made from a compressible material such as high density foam or polyester batting. The suitable padding may be covered in fabric that is suitable for upholstery such as upholstery vinyl. Suitable foams include those having a density of from about 2.0 to 4.0 pounds per cubic foot, and a firmness of from about 30 to 60 IFD, e.g., about 40 to 50 IFD. The padding layer 102 may vary in thickness to accommodate different comfort levels.

Figure 1A:
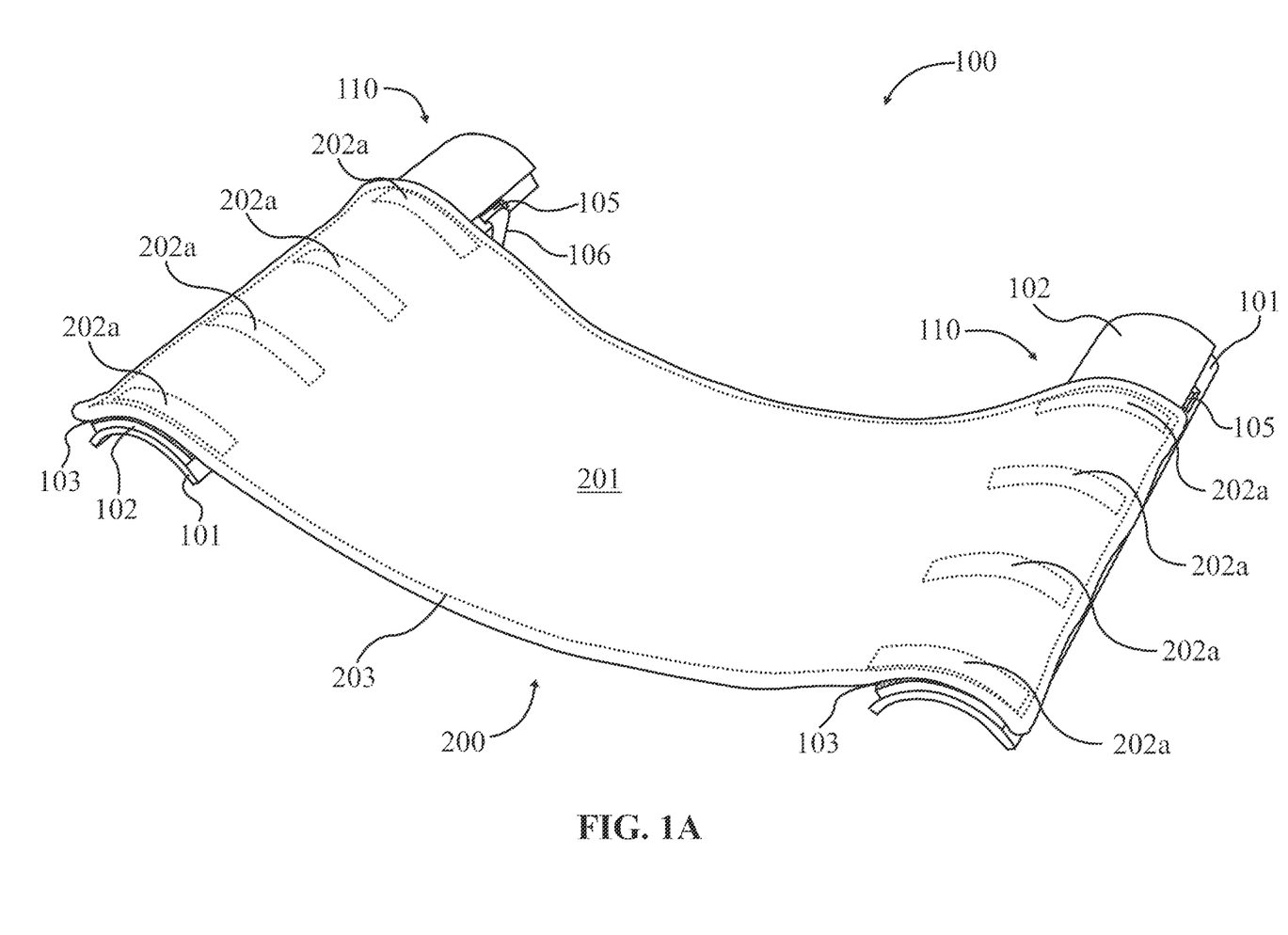
FIG. 1A is a perspective view of an armrest pet hammock device according to one embodiment of the present invention.
Figure 1B:
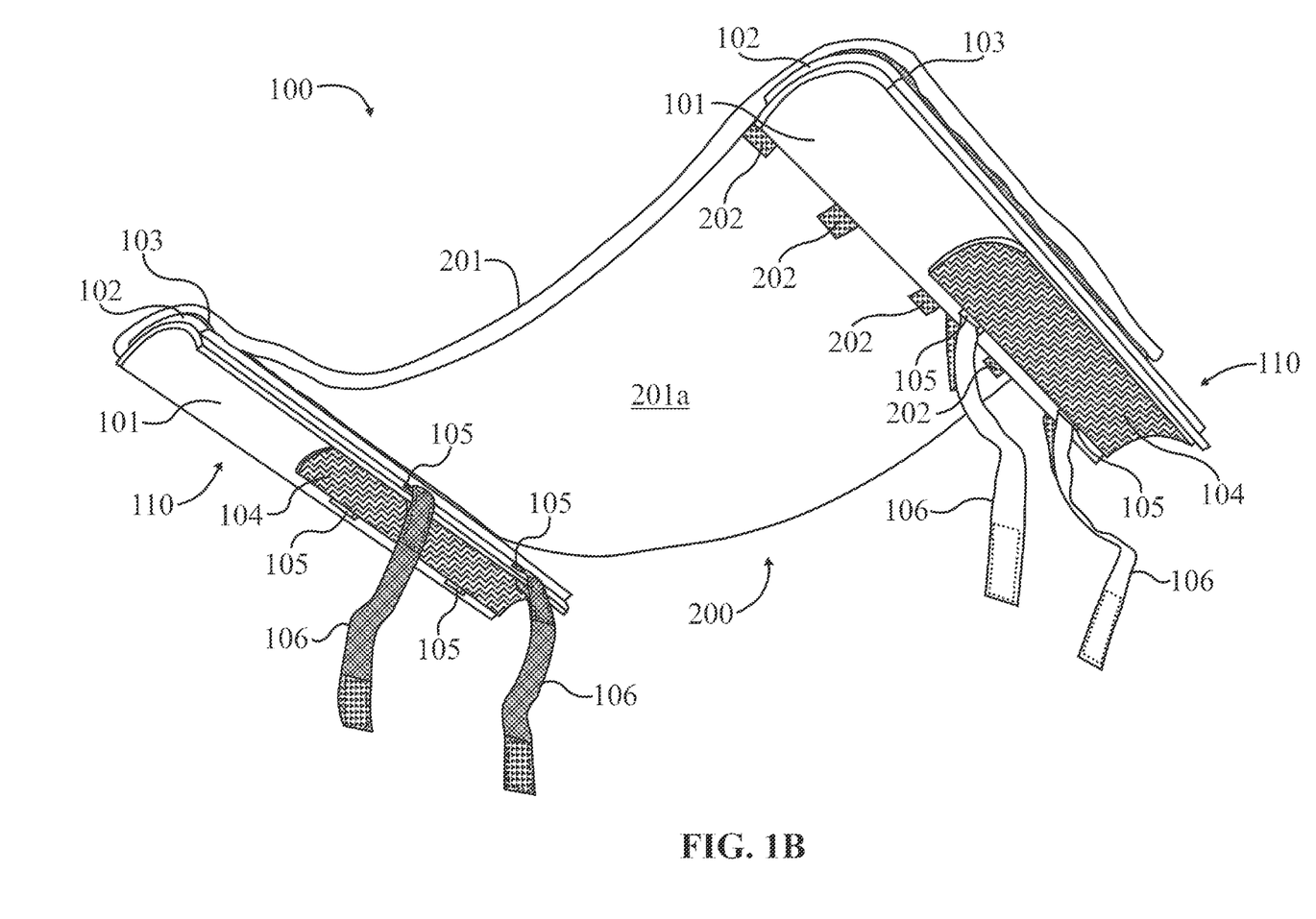
FIG. 1B is a perspective view of the underside of the armrest pet hammock device of FIG. 1A.
Figure 2:
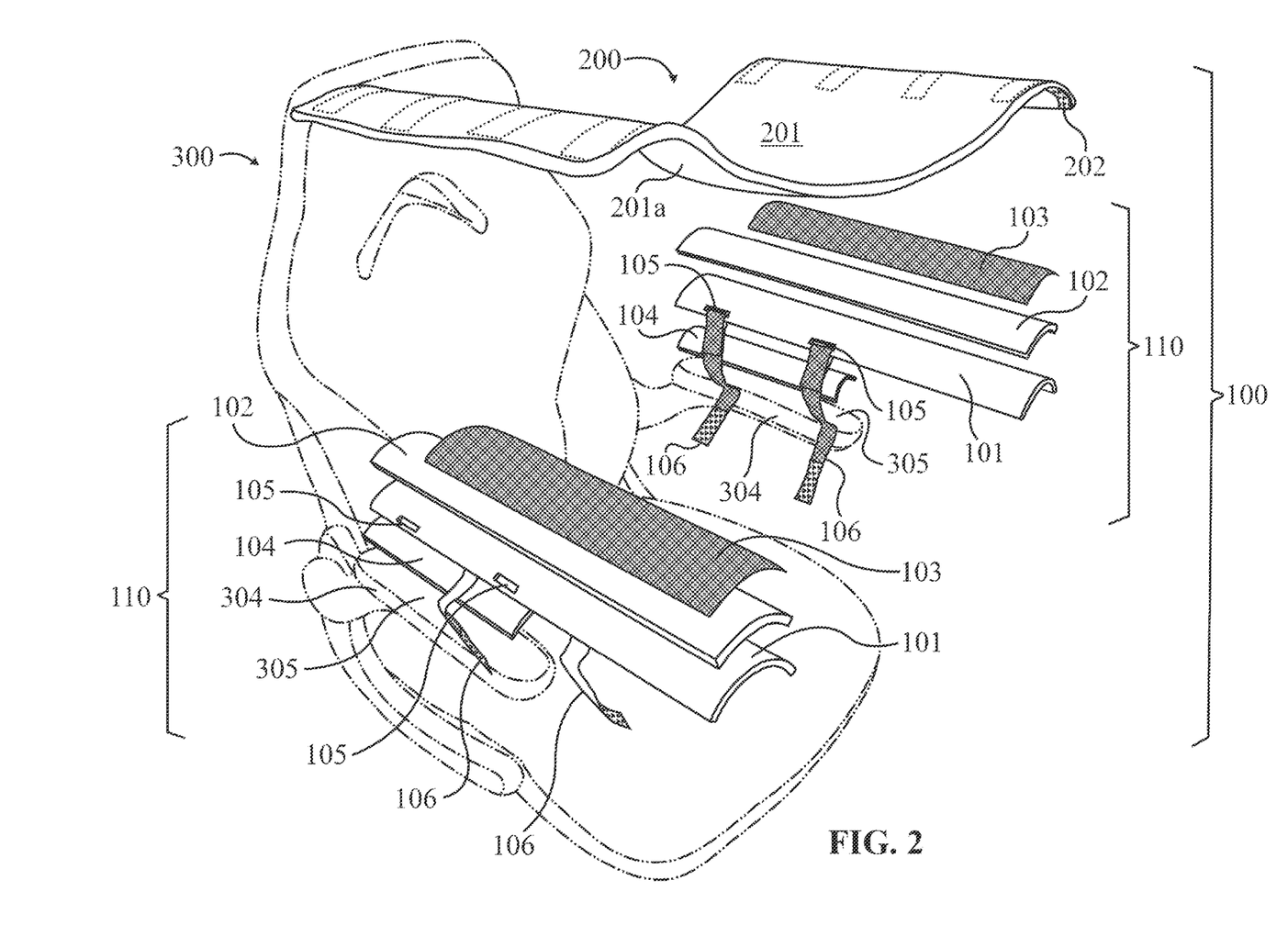
FIG. 2 is a front perspective exploded view of the armrest pet hammock device of FIG. 1A and a typical office chair.
Figure 3A:
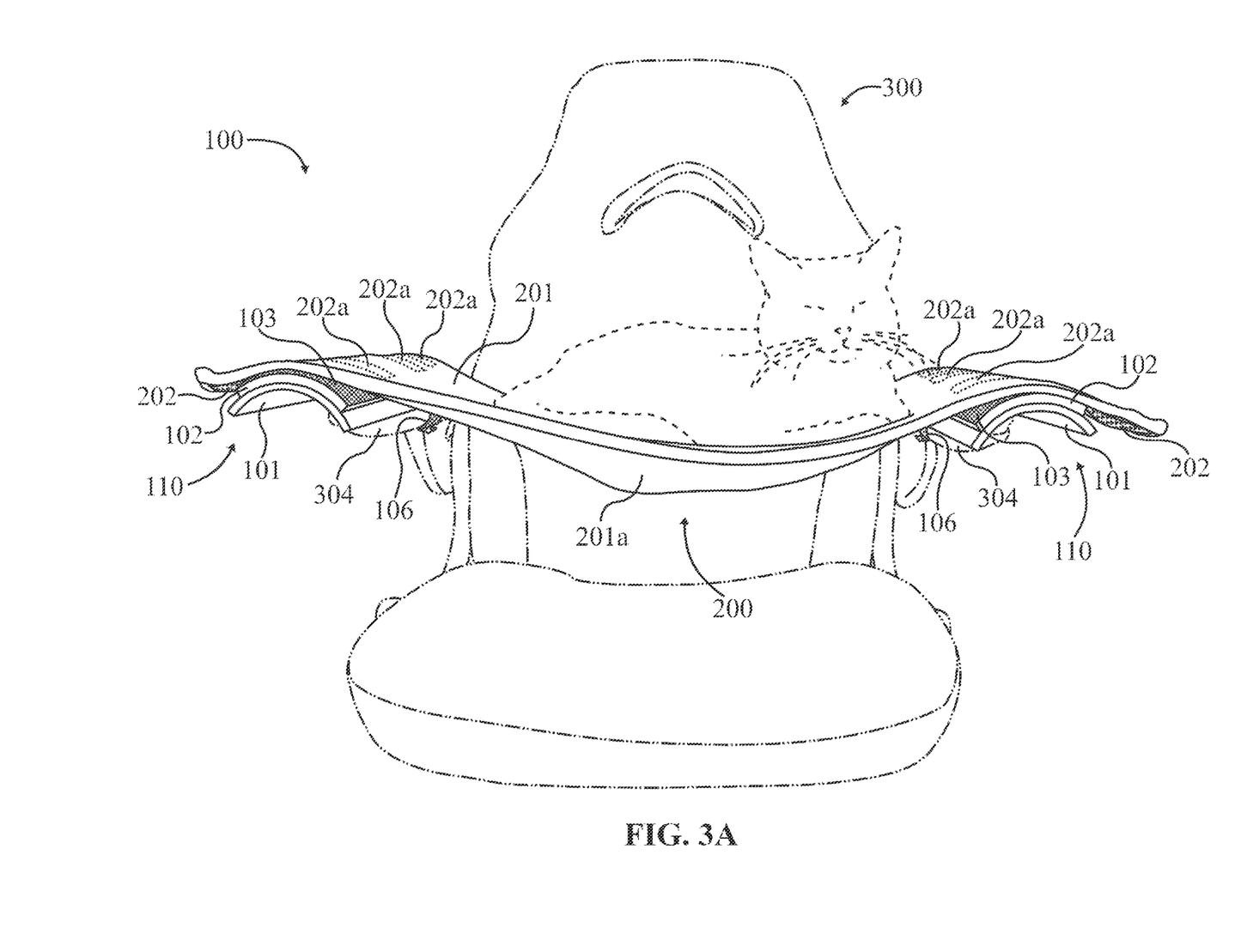
FIGS. 3A and 3B are front and side perspective views, respectively, of the armrest pet hammock device of FIG. 1A and a typical office chair with a cat in the suspended resting area provided by the device.
Figure 3B:
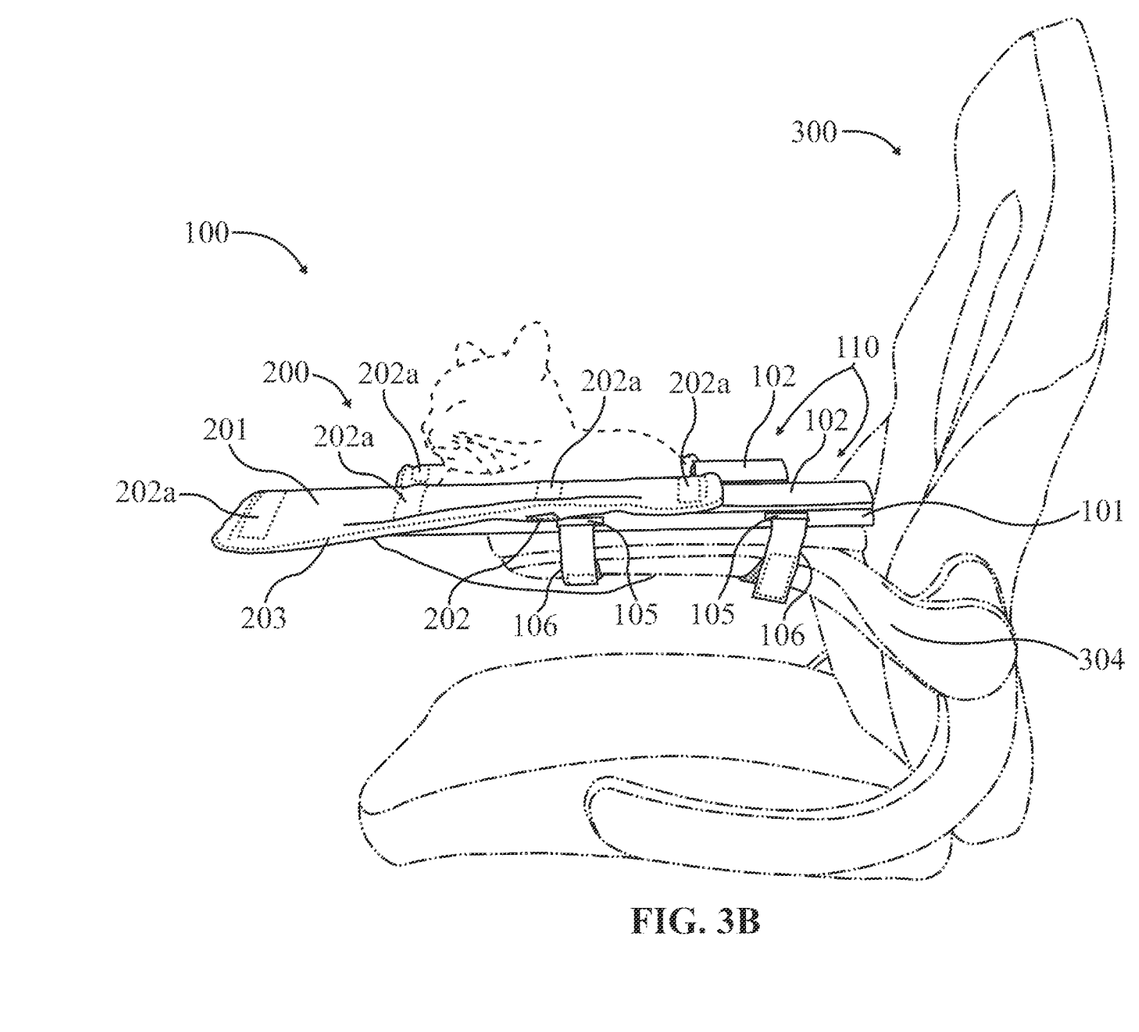
Figure 4A:
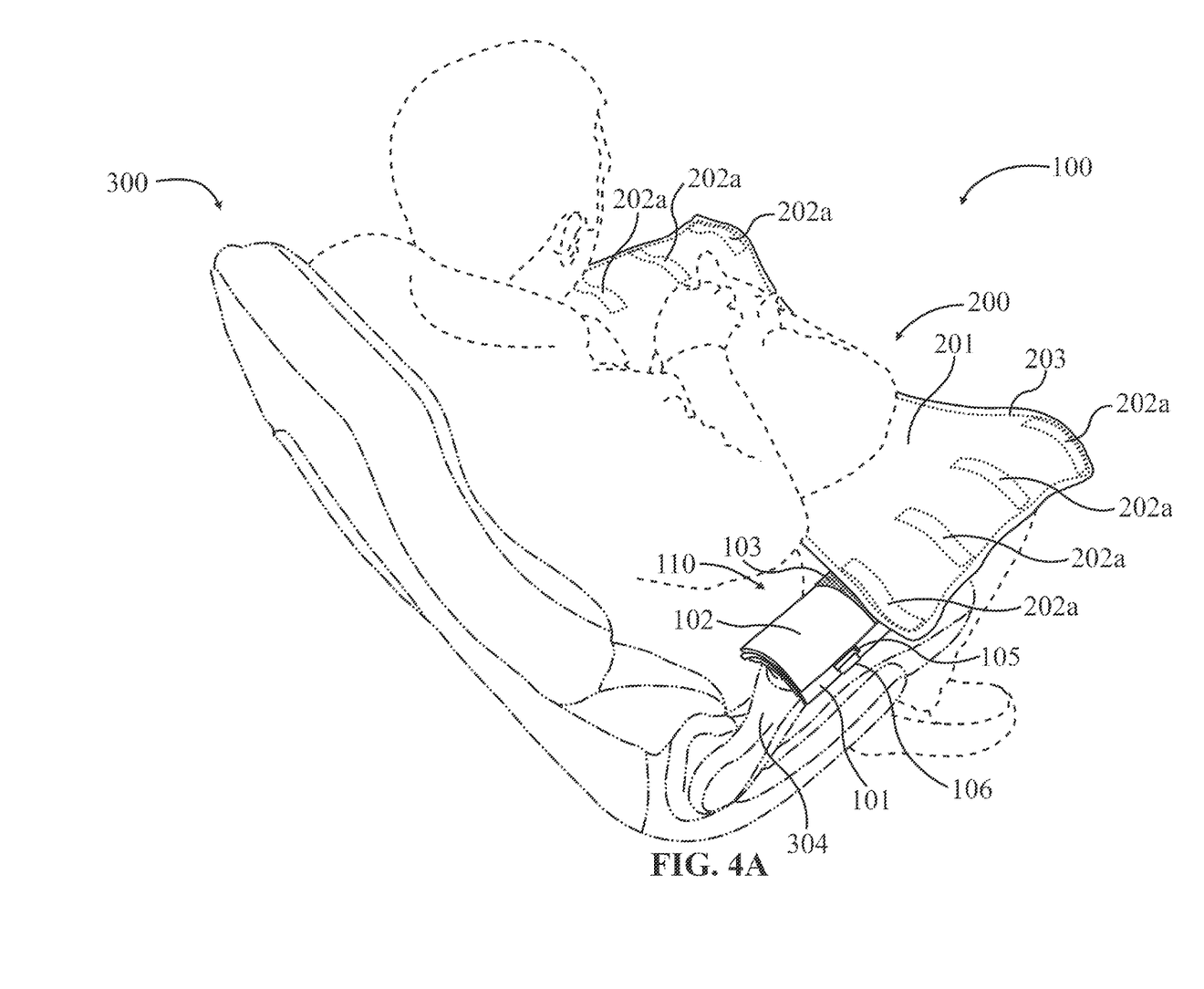
FIGS. 4A and 4B are back and side perspective views, respectively, of the armrest pet hammock device of FIG. 1A and a person sitting in a typical office chair with a cat in the suspended resting area provided by the device.
Figure 4B:
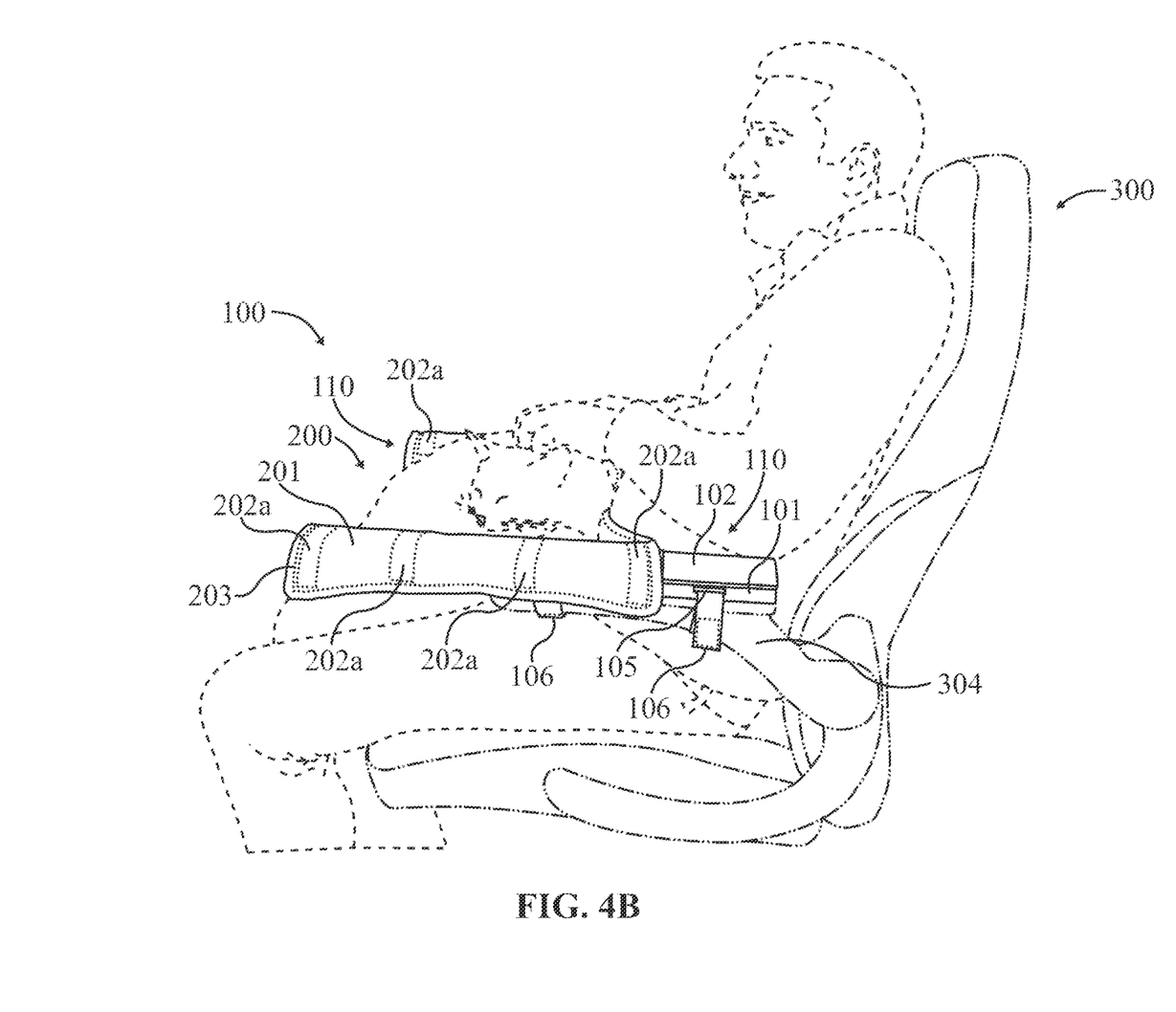
Figure 5A:
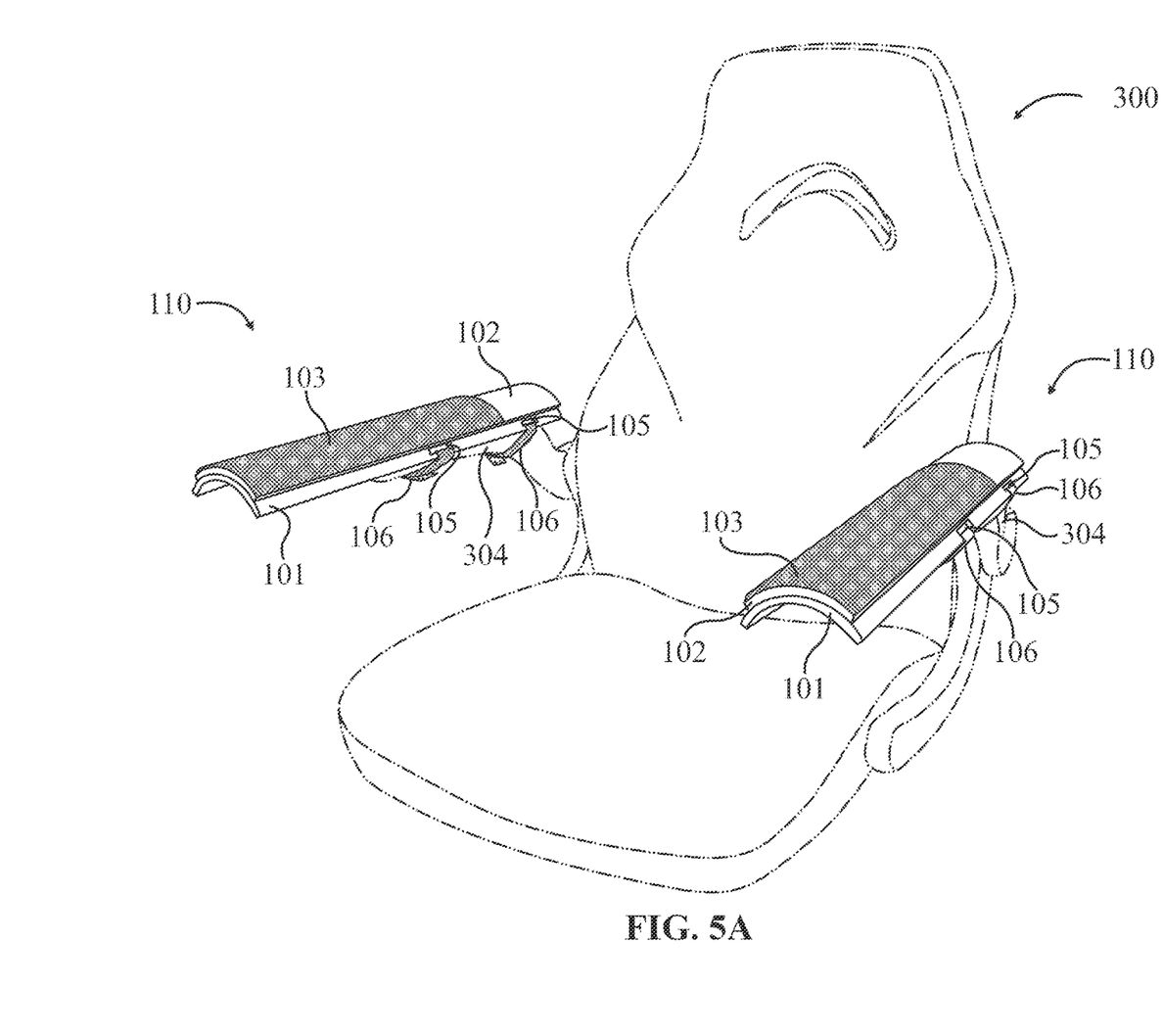
FIG. 5A is a right perspective view of the armrest pet hammock device of FIG. 1A with the fabric covering detached on a typical office chair.
Figure 5B:
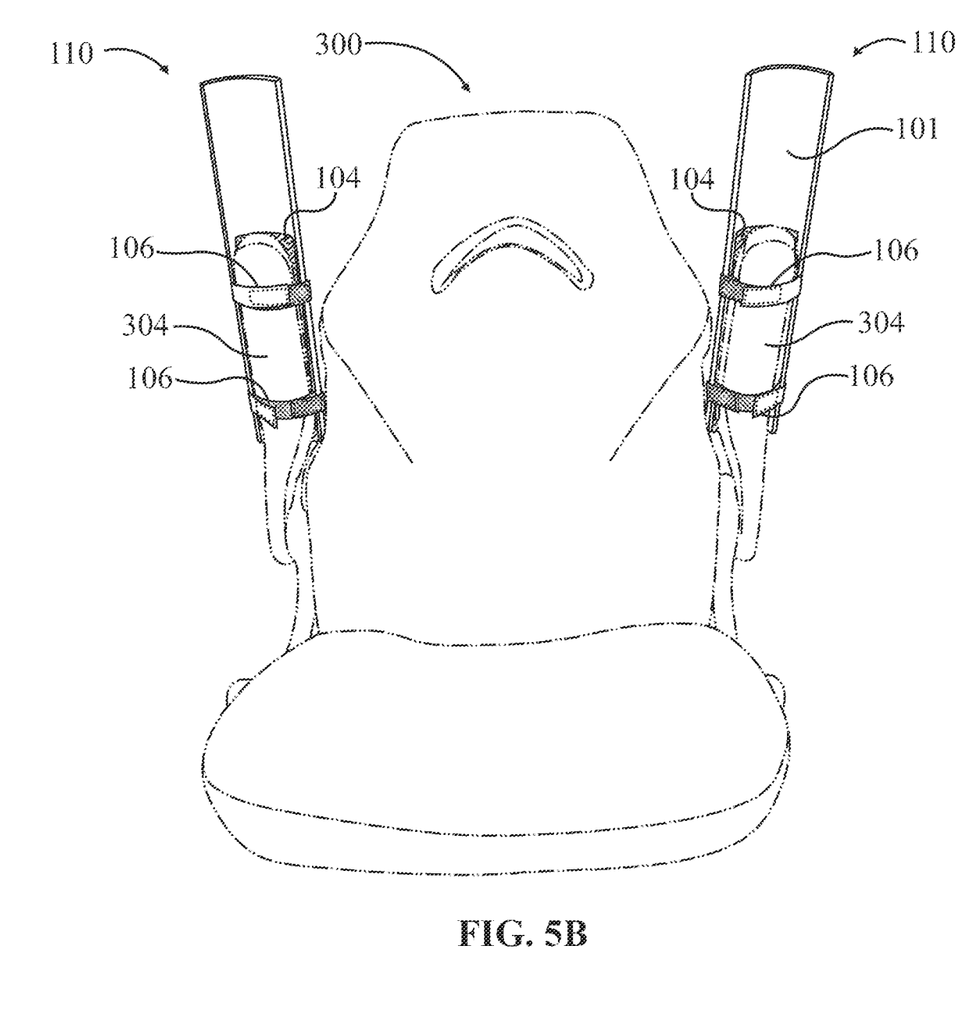
FIG. 5B is a front perspective view of the armrest pet hammock device of FIG. 1A with the fabric covering detached on a typical office chair shown with the armrests in a raised position revealing the underside of the device.

The mating layer 103 is situated on the topmost portion of the armrest covers 110, typically attached directly to the topside of the padding layer 102. The mating layer 103 allows for temporary and strong attachment between the top of both armrest covers 110 and the mating areas 202 found on either ends of the underside of the fabric covering 200. The mating layer 103 will generally have length D (FIG. 7B) of from about 25 to 40 cm, for example, 30 to 35 cm, which will generally mirror the width of the fabric covering length E (FIG. 6B) and a width that generally mirrors the width of the padding layer 102. The mating layer 103 will generally start at the end of the armrest cover 110 furthest from the user and cover roughly 75% of the topside of the padding layer 102. The mating layer 103 will generally be made from a sheet of material with qualities similar to the loop side of a hook and loop fastener system (shown in detail in FIG. 7A) rather than the hook side of the hook and loop system so the device is still comfortable in the event the fabric covering 200 is un installed (FIG. 5A).

Figure 6A:
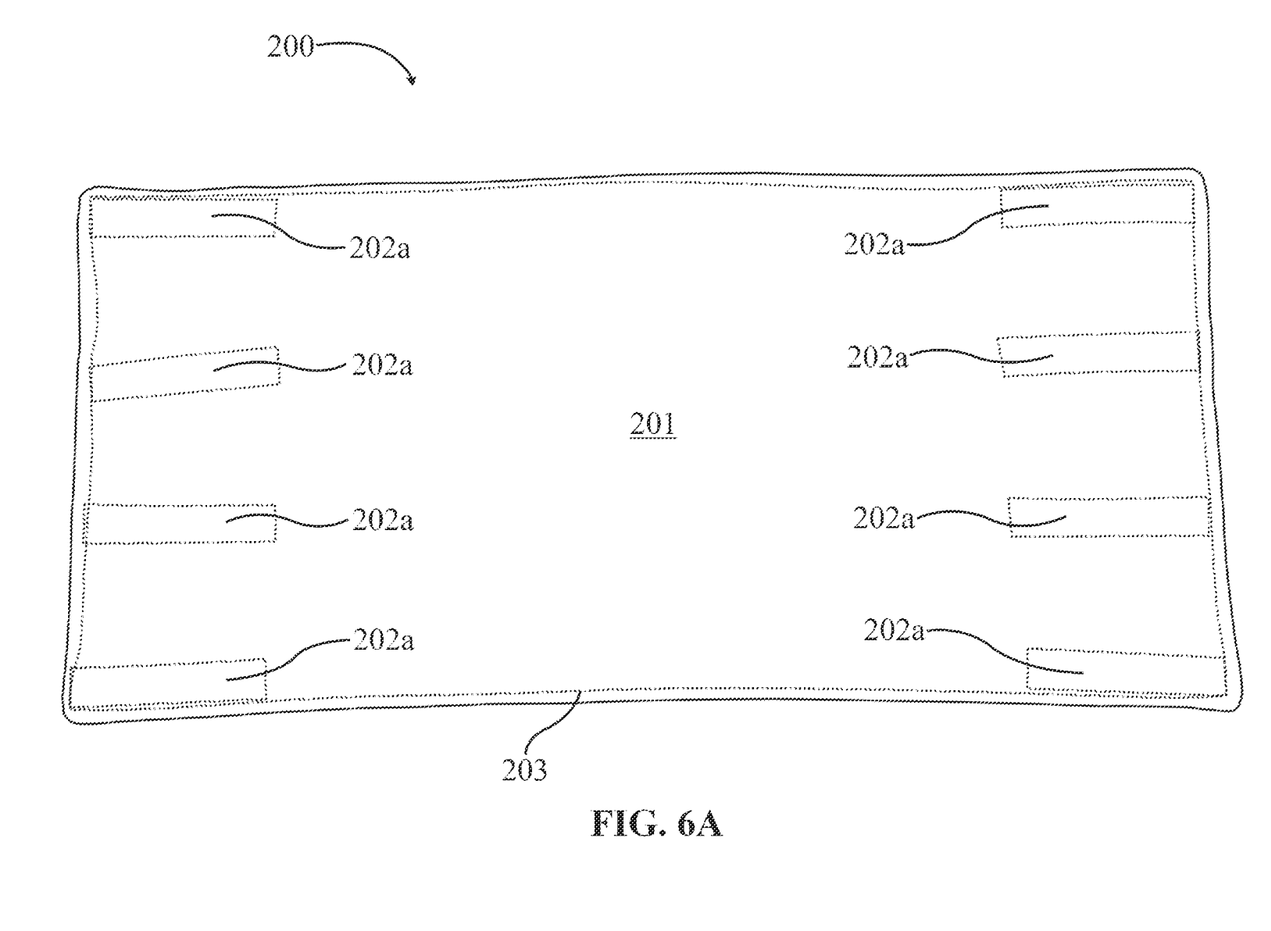
FIGS. 6A and 6B are top and bottom views, respectively, of the armrest pet hammock device of FIG. 1A displaying only the detached fabric covering.
Figure 6B:
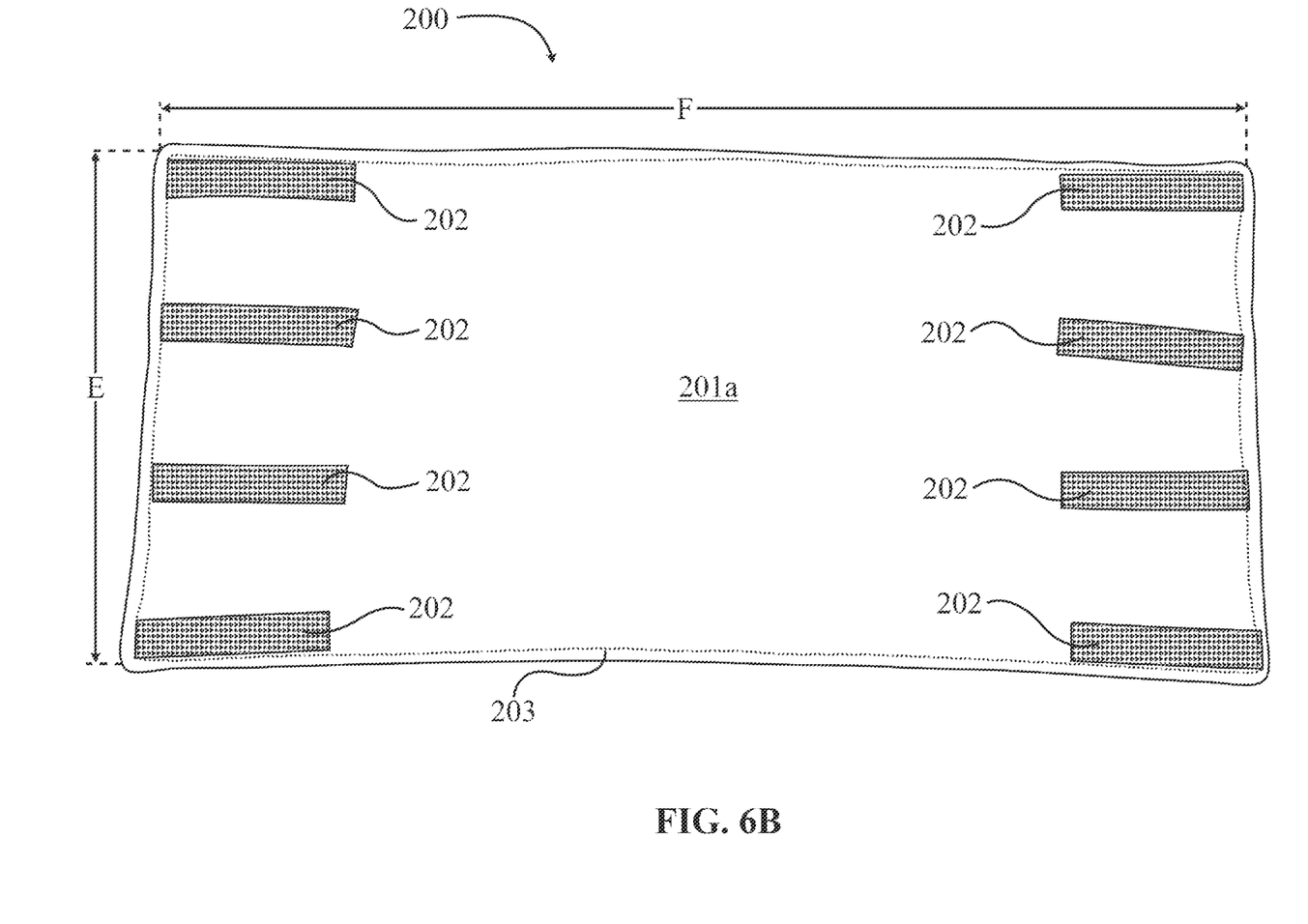

Referring to FIGS. 6A-6B, the fabric covering 200 will generally have two main parts, a rectangular sheet 201 and a plurality of mating areas 202 attached to either ends of the sheet underside 201*a*.

The sheet 201 is formed from a heavy-duty fabric that resists stretching but is also preferably a soft, flexible material that will be comfortable to the pet. Suitable fabrics include but are not limited to fleece, cotton/polyester, denim, denim/polyester, nylon blends, flannel, cotton, and polyester. Some fabrics may have waterproof or water resistant qualities. The sheet 201 will preferably be constructed with at least two sheets of fabric sewn together along the edges, turned inside out, and sewn again along the new edges 203 to prevent fraying and to improve durability. Some embodiments may include a layer of batting between the two sheets to improve comfort, and the entire surface may also be topstitched to increase durability and prevent the fabric covering 200 from stretching when supporting the weight of a pet.

Figure 7B:
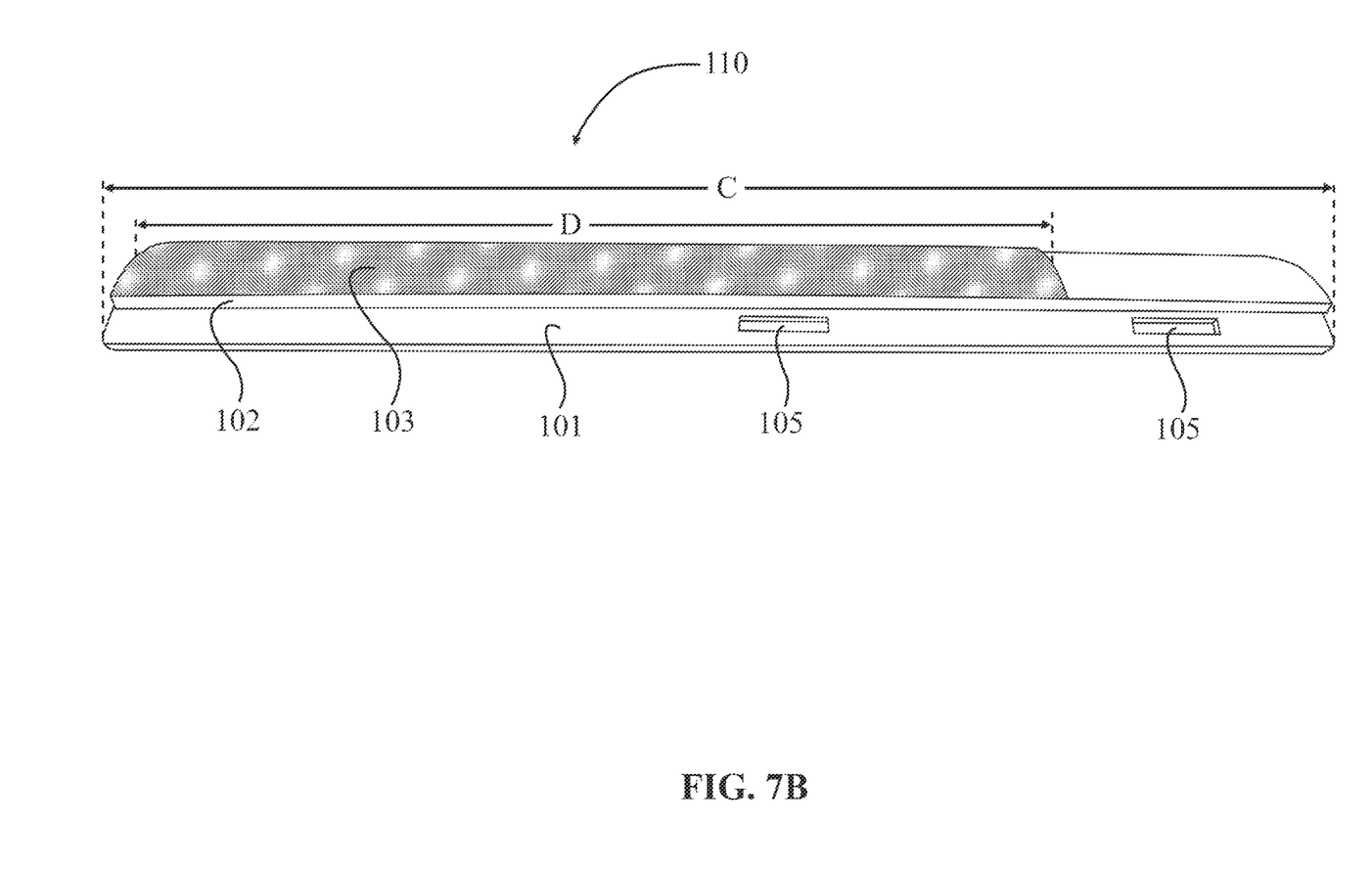

The sheet 201 will generally have length F (FIG. 6B) of from about 70 to 90 cm, for example, 75 to 85 cm, which is roughly the length required to span the gap between the armrests of a typical office chair while also affording the sheet 201 adequate slack to sag slightly in the center. The sheet 201 will generally have width E of from about 25 to 40 cm, for example, 30 to 35 cm, which will generally mirror the length of the mating layer 103 length D (FIG. 7B). These dimensions provide most small pets, i.e., pets weighing less than 25 pounds, enough space to lie comfortably.

Attached to the sheet underside 201*a* may be a plurality of mating areas 202 which can be seen in phantom 202*a* in the top view of the fabric covering 200 (FIG. 7A). Generally, the mating areas 202 will exist on the lengthwise ends of the sheet underside 201*a* and will preferably cover enough of the sheet underside 201*a* so they may still connect to the mating layer 103 provided by the armrest covers 110 even when they are attached to a smaller chair with a narrow sitting area or when the fabric covering 200 is pulled very tight to accommodate heavier pets or pets who prefer a firm sleeping area. The mating areas 202 shall be long enough and in sufficient quantity to support a small pet without disconnecting from the armrest covers 110. The mating areas 202 will generally be made from a sheet of material with qualities similar to the hook side of a hook and loop fastener system.

It will be apparent to one with skill in the art that the armrest pet hammock device may be provided using some or all of the mentioned features and components without departing from the spirit and scope of the present invention. It will also be apparent to the skilled artisan that the embodiments described above are specific examples of a single broader invention that may have greater scope than any of the singular descriptions taught. There may be many alterations made in the descriptions without departing from the spirit and scope of the present invention.

I claim:

1. A pet hammock for removable placement on armrests of a chair, comprising:
 a first armrest cover configured to be removably attached to a first armrest of the chair including:
  a first rigid core having a first non-slip portion on an underside of the first rigid core, the first non-slip portion configured to be in contact with and grip an upper side of the first armrest when the first armrest cover is removably attached to the first armrest of the chair;
  a first padding layer coupled to a topside of the first rigid core and having a first mating portion on an upper side of the first padding layer configured to removably secure a covering to an upper side of the first armrest cover; and
  a first plurality of attachment elements coupled to the first rigid core to removably attach the first rigid core and the first padding layer of the first armrest cover to the first armrest; and
 a second armrest cover configured to be removably attached to a second armrest of the chair including:
  a second rigid core having a second non-slip portion on an underside of the second rigid core, the second non-slip portion configured to be in contact with and grip an upper side of the second armrest when the second armrest cover is removably attached to the second armrest of the chair, where the first and second non-slip portions prevent inward rotation of the covering when the first and second armrest covers are removably attached to the first and second armrests and downward force is applied to the covering;
  a second padding layer coupled to a topside of the second rigid core and having a second mating portion on an upper side of the second padding layer configured to removably secure the covering to an upper side of the second armrest cover; and
  a second plurality of attachment elements coupled to the second rigid core to removably attach the second rigid core and the second padding layer of the second armrest cover to the second armrest,
 where the first and second rigid cores have sufficient rigidity to support a pet placed on the covering when removably attached to the first and second armrest covers in a hammock configuration.

2. The pet hammock of claim 1, further comprising:
 the covering capable of supporting the weight of a pet in a hammock configuration and having first and second opposing sides, the first side having a first mating portion and the second side having a second mating portion,
 where the first mating portion of the first padding layer is configured to mate with the first mating portion of the covering to removably secure the first side of the covering to an upper side of the first armrest cover and where the second mating portion of the second padding layer is configured to mate with the second mating portion of the covering to removably secure the second side of the covering to an upper side of the second armrest cover.

3. The pet hammock of claim 2, where the covering is formed of one or more of two layers of fabric, a covering padding layer between the two layers of fabric, and includes fleece, cotton/polyester, denim, denim/polyester, nylon blends, flannel, cotton, and polyester.

4. The pet hammock of claim 2, where the covering includes topstitching to prevent stretching of the covering.

5. The pet hammock of claim 2, where the tension of the covering when removably secured to the upper sides of the first and second armrest covers in the hammock configuration is adjustable by adjusting one or more of the mating of the first mating portion of the covering with the first mating portion of the first padding layer and the mating of the second mating portion of the covering with the second mating portion of the second padding layer.

6. The pet hammock of claim 2, where the first and second mating portions of the covering are formed of one or more of hook material and hook and loop material and where the first and second mating portions of the first and second padding layers are formed of one or more of loop material and hook and loop material.

7. The pet hammock of claim 1, where a length of at least one of the first and second cores extends beyond a length of at least one of the corresponding first and second armrests.

8. The pet hammock of claim 1, where at least one of the first and second cores has a concave shape that approximates a concave shape of an upper side of a corresponding one of the first and second armrests of the chair and extends uniformly a length of said respective first and second core.

9. The pet hammock of claim 1, where the first and second non-slip portions of the first and second cores are first and second non-slip layers permanently mated with the underside of the first and second cores.

10. The pet hammock of claim 9, where the first and second non-slip layers on the underside of the first and second cores are formed of compressible material operable to conform to the contour of the upper sides of the first and second armrests when the first and second armrest covers are removably attached to the first and second armrests of the chair.

11. The pet hammock of claim 10, where the first and second non-slip layers are formed from a compressible material of closed cell foam where the exposed side of the foam has a non-slip polymer coating.

12. The pet hammock of claim 1, where the first and second non-slip portions on the underside of the first and second cores are one or more of a non-slip polymer coating and textured.

13. The pet hammock of claim 1, where the first and second cores include materials selected from the group consisting of plastic, woods, fiberglass, metals and composite materials.

14. The pet hammock of claim 1, where a length of the first padding layer is approximately equal to a length of the first core and a length of the second padding layer is approximately equal to a length of the second core.

15. The pet hammock of claim 1, where the first and second padding layers are connected to the topside of the respective first and second rigid cores and where the first and second mating portions of the first and second padding layers are first and second mating layers affixed and connected to an upper side of the first and second padding layers.

16. The pet hammock of claim 1, where one or more of the first and second padding layers is formed of one or more of a batting core encased by fabric and foam having a density from approximately 2.0 to 4.0 pounds per cubic foot.

17. The pet hammock of claim 1, where the first plurality of attachment elements include a first plurality of attachment straps configured to wrap under the first armrest to removably attach the first core and the first padding layer of the first armrest cover to the first armrest of the chair and the second plurality of attachment elements include a second plurality of attachment straps configured to wrap under the second armrest to removably attach the second core and the second padding layer of the second armrest cover to the second armrest of the chair.

18. The pet hammock of claim 17, where the first core has a plurality of holes along one or more lengthwise edges of the first core configured to receive the first plurality of attachment straps and the second core has a plurality of holes along one or more lengthwise edges of the second core configured to receive second first plurality of attachment straps.

19. The pet hammock of claim 18, where a width of the first padding layer is less than a width of the first core to accommodate mating of the first plurality of attachment straps to the first plurality of holes of the first core and where a width of the second padding layer is less than a width of the second core to accommodate mating of the second plurality of attachment straps to the second plurality of holes of the second core.

20. The pet hammock of claim 1, where the first core and the first padding layer of the first armrest cover are removably attached to the first armrest of the chair by tightening the plurality of attachment elements around an underside of the first armrest of the chair and where the second core and the second padding layer of the second armrest cover are removably attached to the second armrest of the chair by tightening the plurality of attachment elements around an underside of the second armrest of the chair.

* * * * *